Nov. 18, 1958 E. H. STEIN 2,860,601
DRINKING FOUNTAIN FOR LIVESTOCK
Filed April 20, 1956 2 Sheets-Sheet 1
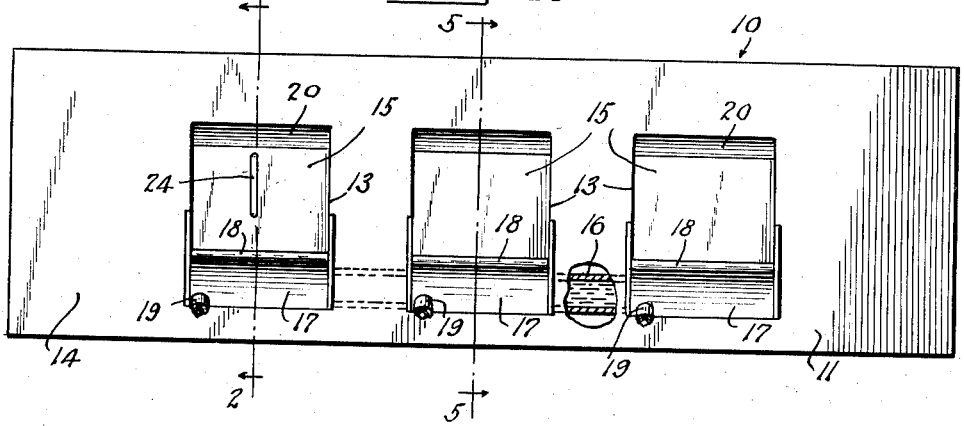
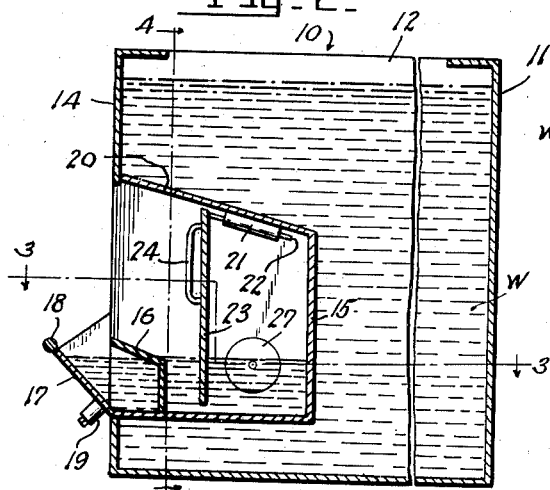
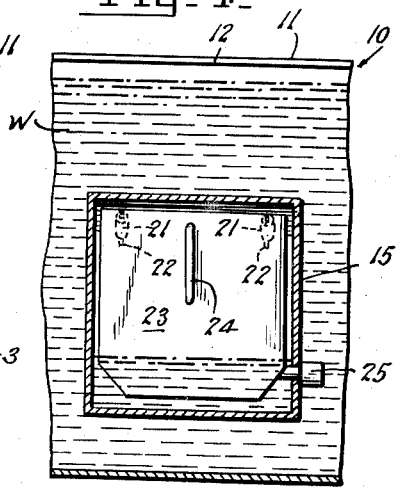
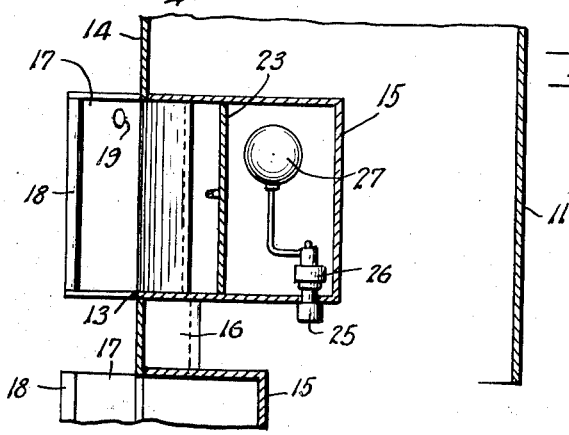
INVENTOR.
EDWARD HERBERT STEIN
BY
Patrick D. Beavers
ATTORNEY.

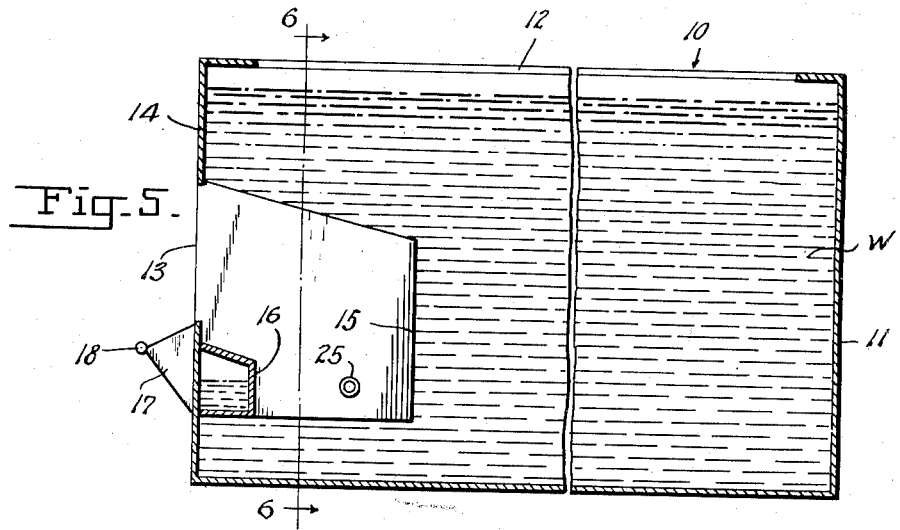
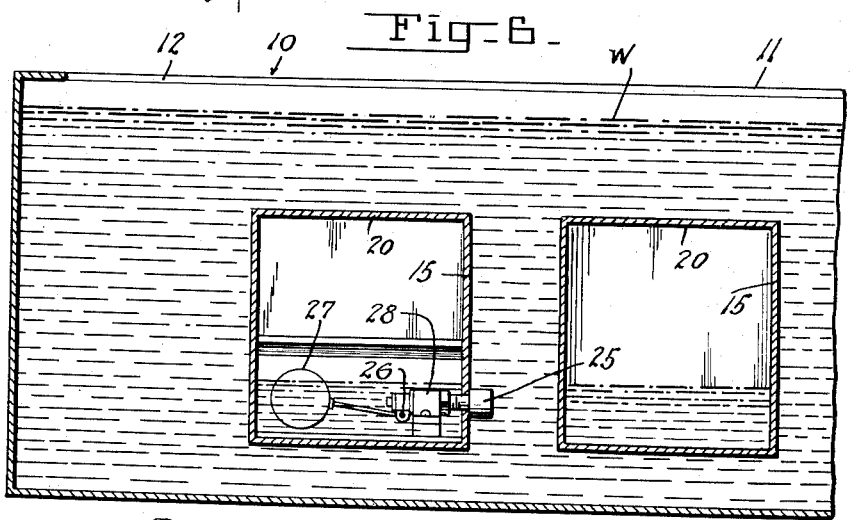
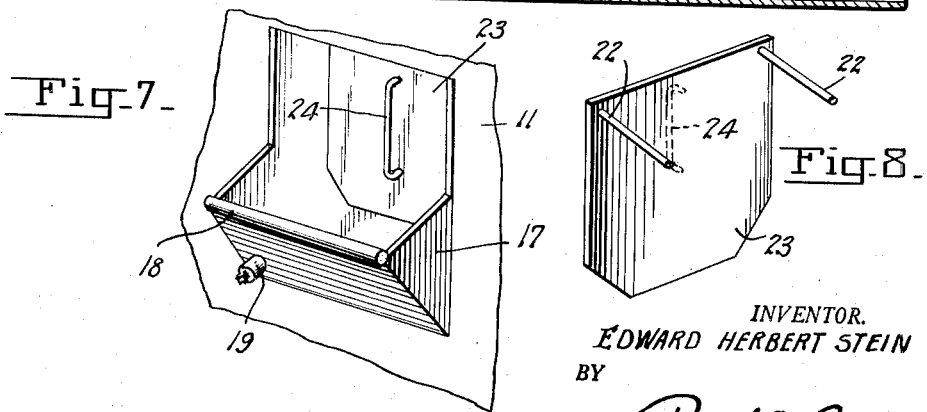

United States Patent Office 2,860,601
Patented Nov. 18, 1958

2,860,601

DRINKING FOUNTAIN FOR LIVESTOCK

Edward Herbert Stein, Leland, Ill.

Application April 20, 1956, Serial No. 579,644

1 Claim. (Cl. 119—78)

This invention relates to improvements in drinking fountains for domesticated animals such as pigs and hogs.

An object of the invention is to provide a drinking fountain that will not injure the animals as they are drinking from the fountain.

Another object of the invention is to provide a float and valve assembly that cannot be damaged by the animals drinking from the fountain.

With the above and other objects and advantages in view the invention consists of the novel details of construction, arrangement and combination of parts more fully hereinafter described, claimed and illustrated in the accompanying drawings in which:

Fig. 1 is a front elevational view of a drinking fountain embodying the invention;

Fig. 2 is a fragmentary vertical sectional view on the line 2—2 of Fig. 1;

Fig. 3 is a fragmentary transverse sectional view on the line 3—3 of Fig. 2;

Fig. 4 is a fragmentary transverse sectional view on the line 4—4 of Fig. 2;

Fig. 5 is a fragmentary vertical sectional view on the line 5—5 of Fig. 1;

Fig. 6 is a fragmentary vertical sectional view on the line 6—6 of Fig. 5;

Fig. 7 is a perspective view of one of the drinking troughs; and

Fig. 8 is a perspective view of the door that prevents the animals from coming in contact with the float and valve assembly of the drinking fountain.

Referring more in detail to the drawings, wherein like parts are designated by like reference numerals, the reference numeral 10 is used to generally designate a drinking fountain embodying the invention.

The drinking fountain 10 comprises a large heavy duty tank 11 that is adapted to be filled with water W.

The top of the tank 11 is provided with an opening 12 through which cattle and horses may drink from the tank 11. To smaller animals such as pigs and hogs, a plurality of openings 13 is provided in the front wall 14 of the tank 11.

Positioned in the rear of the wall 14 and communicating with the openings 13 is a plurality of hoppers 15. The front edges of the walls of the hoppers 15 are integrally connected to the rear surface of the wall 14 of the tank 11 to make a water tight seam between the hoppers 15 and the wall 14.

In Fig. 1 a sluiceway 16 is shown connecting the hoppers 15 in series so that water from the tank 11 entering the sluiceway 16 will enter the hoppers 15.

A triangular shaped trough 17, Fig. 7, is secured to the front wall 14 of the tank 11 over the lower portion of each of the openings 13 and the edges of the trough 17 are integrally connected to the face of the front wall 14 at the lower portion of each opening 13 to provide a water tight seam.

A rod 18 extending across the upper longitudinal edge of each trough 17 prevents the pigs or hogs from cutting their necks.

Each trough 17 is provided with a drain plug 19 so that dirt and other sediment may be drained from each of the troughs 17.

The inner surface of the top wall 20 of each hopper 15 is provided with a pair of parallel spaced sleeves 21 to receive the parallel spaced rods 22 of a protective door 23. The door 23 is positioned in the hopper 15 to protect the float and valve assembly of the drinking fountain. A handle 24 on the face of the door permits the door to be removed to gain access to the float and valve assembly as desired.

Water W will enter one of the hoppers 15 by means of an inlet pipe 25 and a valve 26 controlled by a float 27 is connected to the inlet pipe 25 within the hopper 15. The first hopper 15 is usually provided with the inlet pipe 25 so that as water enters the first hopper it will by means of the sluiceway 16 enter the other hoppers in the tank 11.

The valve 26 and float 27 are mounted in the rear of the door 23 by means of a bracket 28 so that the pigs and hogs cannot damage the valve and float. Only one valve and float is necessary to control the entrance of the water into the hoppers 15 because of the sluiceway 16 which connects all of the hoppers 15 in series.

It will be apparent that as the pigs and hogs drink from any of the troughs 17 the water therein will lower causing the float 27 to operate the valve 26 to cause water from the tank 11 to again fill up the hoppers 15. The door 23 will prevent the pigs and hogs from damaging the float and valve assembly and thus causing a stoppage of the flow of water or an overflow of the water.

It is believed that the operation and construction of the drinking fountain will be apparent to those skilled in the art and it is to be understood that changes in the minor details of construction, arrangement and combination of parts may be resorted to provided they fall within the spirit of the invention and the scope of the appended claim.

Having thus described the invention what is claimed as new and desired to be secured by Letters Patent is:

A drinking fountain for livestock comprising an elongated water tank having a plurality of longitudinally spaced openings in one side wall thereof, a trough extending outwardly from the lower portion of each opening, a plurality of hoppers each affixed to the inner side of said wall about one of said openings, a sluiceway interconnecting the lower portions of said hoppers, and float-valve controlled means in one of said hoppers for admitting water from said tank, whereby a preselected level of water is maintained in all of said troughs.

References Cited in the file of this patent

UNITED STATES PATENTS

| | | |
|---|---|---|
| 1,725,628 | Gerhardt | Aug. 20, 1929 |
| 2,532,999 | Donahoe et al. | Dec. 5, 1950 |